(12) United States Patent
Hayashi et al.

(10) Patent No.: US 6,698,199 B2
(45) Date of Patent: Mar. 2, 2004

(54) SWASH PLATE TYPE HYDRAULIC DRIVE TRANSMISSION AND HYDROSTATIC TYPE CONTINUOUSLY VARIABLE TRANSMISSION

(75) Inventors: Tsutomu Hayashi, Saitama (JP); Yoshihisa Kanno, Saitama (JP); Kenji Sakakibara, Saitama (JP); Nobuyuki Yakigaya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/112,877

(22) Filed: Apr. 2, 2002

(65) Prior Publication Data

US 2002/0170289 A1 Nov. 21, 2002

(30) Foreign Application Priority Data

Apr. 9, 2001 (JP) .......................... 2001-110422

(51) Int. Cl.$^7$ ............................... F16H 39/14
(52) U.S. Cl. ........................... 60/489; 91/476
(58) Field of Search ................. 60/487, 489; 91/474, 91/476, 478, 479, 480

(56) References Cited

U.S. PATENT DOCUMENTS

| | | | | | |
|---|---|---|---|---|---|
| 2,229,715 | A | * | 1/1941 | Zimmermann | 91/476 |
| 2,391,575 | A | * | 12/1945 | Huber | 91/480 |
| 2,923,251 | A | * | 2/1960 | Laney | 91/480 |
| 5,205,123 | A | * | 4/1993 | Dunstan | 60/489 |
| 6,324,843 | B1 | * | 12/2001 | Yasuda et al. | 60/489 |

FOREIGN PATENT DOCUMENTS

JP      11-82288 A      3/1999

* cited by examiner

*Primary Examiner*—Thomas E. Lazo
(74) *Attorney, Agent, or Firm*—Birch, Stewart, Kolasch & Birch, LLP

(57) ABSTRACT

Distributing valves of a swash plate type hydraulic drive transmission can make a cylinder block smaller and reduce the number of processes and the number of parts. Distributing valves alternately switch, corresponding to the axial reciprocating motion of plungers, communication and cutoff between communication passages communicated to oil chambers opening to the inner surface of cylinder holes and low pressure ports and high pressure ports communicated to a low pressure oil passage and a high pressure oil passage opening to the inner surface of the cylinder holes.

12 Claims, 13 Drawing Sheets

SWASH PLATE TYPE HYDRAULIC DRIVE TRANSMISSION AND HYDROSTATIC TYPE CONTINUOUSLY VARIABLE TRANSMISSION

CROSS-REFERENCE TO RELATED APPLICATIONS

The present application claims priority under 35 USC 119 to Japanese Patent Application No. 2001-110422 filed on Apr. 9, 2001 the entire contents thereof is hereby incorporated by reference.

BACKGROUND OF THE INVENTION

1. Field of the Invention

The present invention relates to a swash plate type hydraulic drive transmission and a hydrostatic type continuously variable transmission. In particular, the present invention relates to an improvement of a swash plate type hydraulic drive transmission and a hydrostatic type continuously variable transmission each having distributing valves so that when plungers are moved to a side for expanding oil chambers, the oil chambers are communicated to low pressure oil passages; and when plungers are moved to a side for reducing the oil chambers, the oil chambers are communicated to high pressure oil passages.

2. Description of Background Art

A swash plate type hydraulic drive transmission and a hydrostatic type continuously variable transmission is known as disclosed in Japanese Published Unexamined Patent Application No. Hei 11-82288. In this publication, a plurality of first distributing valves are slidably fitted in cylinder blocks in parallel with a plurality of pump plungers that are reciprocatively driven by a first valve swash plate, and a plurality of second distributing valves slidably fitted in cylinder blocks in parallel with a plurality of motor plungers that are reciprocatively driven by a second valve swash plate.

In the prior art, in addition to a plurality of pump cylinder holes and motor cylinder holes, a plurality of sliding holes for slidably fitting therein a plurality of first and second distributing valves are provided in the cylinder block. The diameter of the cylinder block is increased to provide a space for arranging these sliding holes and the number of processes must be increased in order to drill the sliding holes. The first and second distributing valves and a first and a second valve swash plate for driving these distributing valves are necessary and the number of parts is increased.

SUMMARY AND OBJECTS OF THE INVENTION

The present invention has been made in view of such circumstances and an object of the present invention is to provide a swash plate type hydraulic drive transmission and a hydrostatic type continuously variable transmission each having distributing valves which can make a cylinder block smaller thus reducing the number of processes and the number of parts.

To achieve the foregoing object, in the present invention, a swash plate type hydraulic drive transmission includes rotors that are supported in a casing so as to be rotatable about the axis of corresponding cylinder blocks. Plungers are provided with an outer end that is brought into contact with and engaged with swash plates to form oil chambers between the plungers and the closed ends of cylinder holes. The plungers are slidably fitted in a plurality of the bottomed cylinder holes provided in the cylinder blocks in an annular arrangement. Distributing valves allow the oil chambers of the plungers moving to a side for expanding the oil chambers to be in communication with low pressure oil passages and which allow the oil chambers of the plungers moving to a side for reducing the oil chambers to be in communication with high pressure oil passages that are provided to correspond to the plungers between the low pressure oil passages and the high pressure oil passages provided in the rotors and the oil chambers. The distributing valves alternately switch, corresponding to the axial reciprocating motion of the plungers, communication and cutoff communication between a plurality of communication passages communicating with the oil chambers opening to the inner surface of the cylinder holes and a plurality of low pressure and high pressure ports respectively communicating with the low pressure oil passages. The high pressure oil passages open to the inner surface of the cylinder holes.

In the construction of the present invention, distributing valves are constructed so as to switch, by reciprocatively operated plungers, communication and cutoff communication between passages in communication with oil chambers and low pressure and high pressure ports respectively communicating with low pressure oil passages and high pressure oil passages. Sliding holes only for the distributing valves need not be provided in the cylinder block to make the cylinder block smaller and to reduce the number of processes. The number of parts only for the distributing valves are unnecessary to thus reduce the number of parts.

According to the present invention, a hydrostatic type continuously variable transmission in which rotors positioned within cylinder blocks in common with hydraulic pumps and hydraulic motors are supported in a casing so as to be rotatable about the axis of the cylinder blocks. A plurality of pump plungers are provided in the hydraulic pumps to form pump oil chambers between the pump plungers and the closed end of pump cylinder holes and are slidably fitted in the bottomed cylinder holes provided in the cylinder blocks in an annular arrangement. A plurality of motor plungers are provided in the hydraulic motors to form motor oil chambers between the motor plungers and the closed end of the motor cylinder holes that are slidably fitted in the bottomed motor cylinder holes provided in the cylinder blocks in an annular arrangement. A plurality of first distributing valves allow the pump oil chambers of the pump plungers in a suction region to be in communication with low pressure oil passages and which allow the pump oil chambers of the pump plungers in a discharge region to be in communication with high pressure oil passages that are provided and correspond to the pump plungers between the low pressure oil passages and the high pressure oil passages provided in the rotors and the pump oil chambers. A plurality of second distributing valves allow the motor oil chambers of the motor plungers in an expansion region to be in communication with the high pressure oil passages and which allow the motor oil chambers of the motor plungers in a reduction region to be in communication with the low pressure oil passages that are provided and correspond to the motor plungers between the low pressure oil passages and the high pressure oil passages and the motor oil chambers. The first distributing valves alternately switch, corresponding to the axial reciprocating motion of the pump plungers, communication and cutoff communication between a plurality of pump side communication passages in communication with the pump oil chambers opening to the inner surface of the pump cylinder holes and a plurality of first low pressure and high pressure ports respectively in communication with the low pressure oil passages and the high pressure oil passages opening to the inner surface of the pump cylinder holes. The second distributing valves alternately switch, corresponding to the axial reciprocating motion of the motor plungers, communication and cutoff communication between a plurality of motor side communication passages in communication with the motor oil chambers opening to the inner surface of the motor cylinder holes and a plurality of second low pressure and high pressure ports respectively in communication with the low pressure oil passages and the high pressure oil passages opening to the inner surface of the motor cylinder holes.

In the construction of the present invention, first distributing valves are constructed so as to switch, by reciprocatively operated pump plungers, communication and cutoff communication between pump side communication passages in communication with pump oil chambers and first low pressure and high pressure ports respectively in communication with low pressure oil passages and high pressure oil passages. Second distributing valves are constructed so as to switch, by reciprocatively operated motor plungers, communication and cutoff communication between motor side communication passages in communication with motor oil chambers and second low pressure and high pressure ports respectively in communication with low pressure oil passages and high pressure oil passages. Sliding holes only for the first and second distributing valves need not be provided in the cylinder block thus making the cylinder block smaller and reducing the number of processes. In addition, parts only for the first and second distributing valves are unnecessary thus reducing the number of parts.

According to the present invention, the rotor includes the cylinder block and a rotation axis coaxially pressed into the cylinder block, a plurality of the pump side communication passages are in part constructed by a plurality of pump side communication grooves provided in the outer circumferential surface of the rotation axis. A plurality of the motor side communication passages are in part constructed by a plurality of motor side communication grooves provided in the outer circumferential surface of the rotation axis. According to such a construction, the pump side communication grooves and the motor side communication grooves are easily provided in the outer circumferential surface of the rotation axis. Thus, the number of processes can be further reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention will be described hereinbelow based on the embodiments of the present invention shown in the accompanying drawings.

Figure 1:
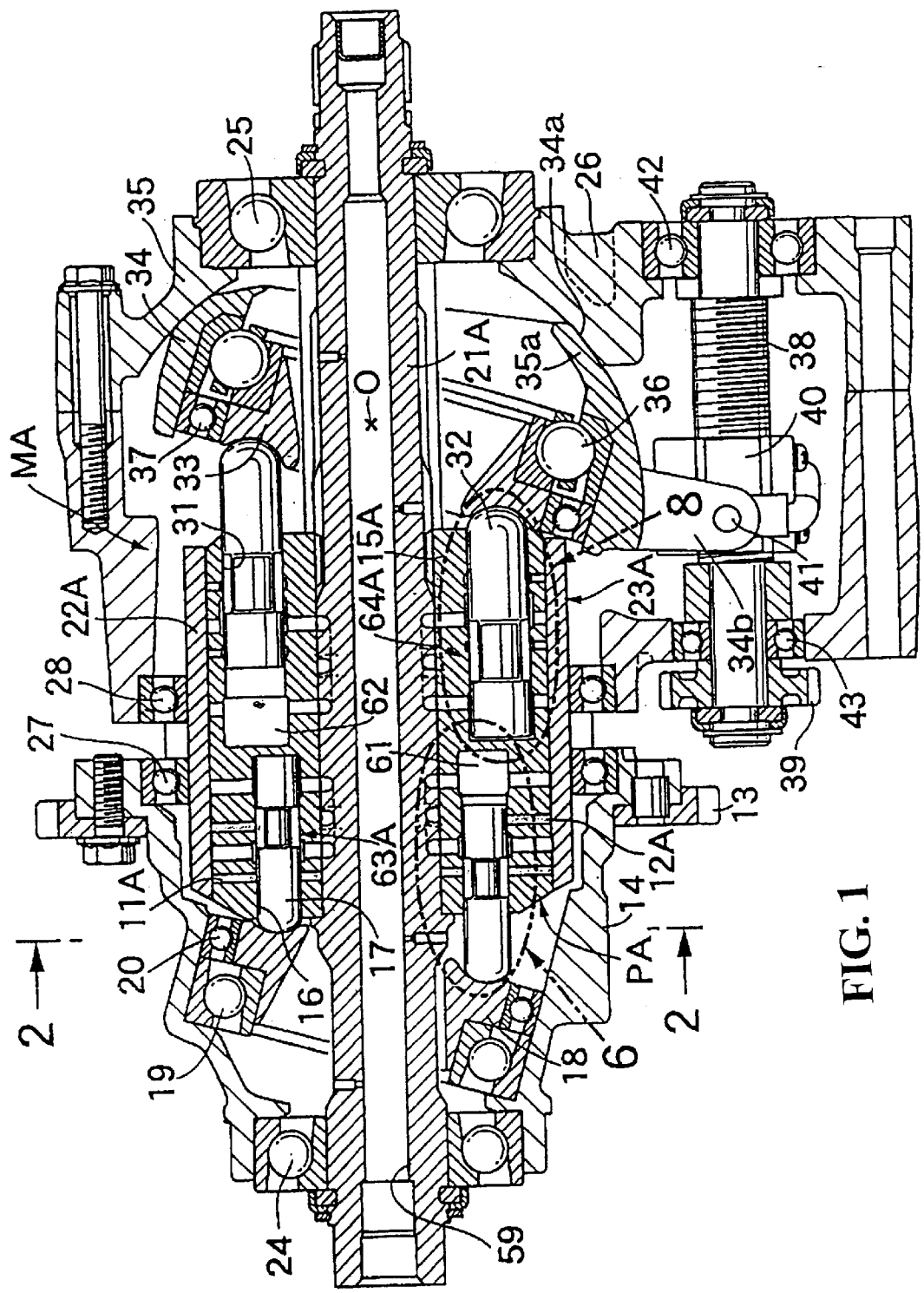
FIG. 1 is a longitudinal sectional view of a hydrostatic type continuously variable transmission according to a first embodiment and a cross-sectional view taken along line 1—1 of FIG. 2.
Figure 2:
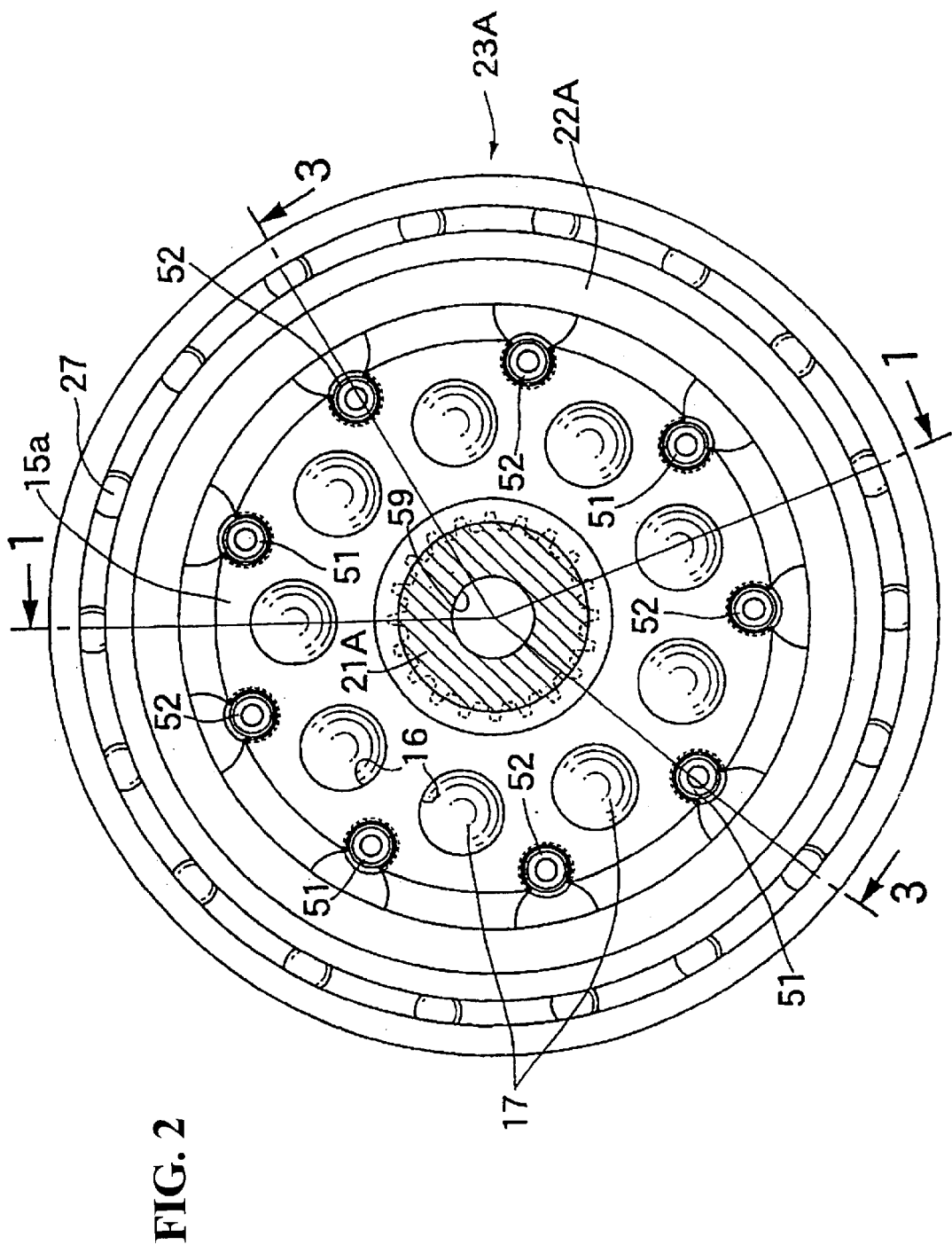
FIG. 2 is a cross-sectional view of a rotor viewed in the arrow direction of line 2—2 of FIG. 1.
Figure 3:
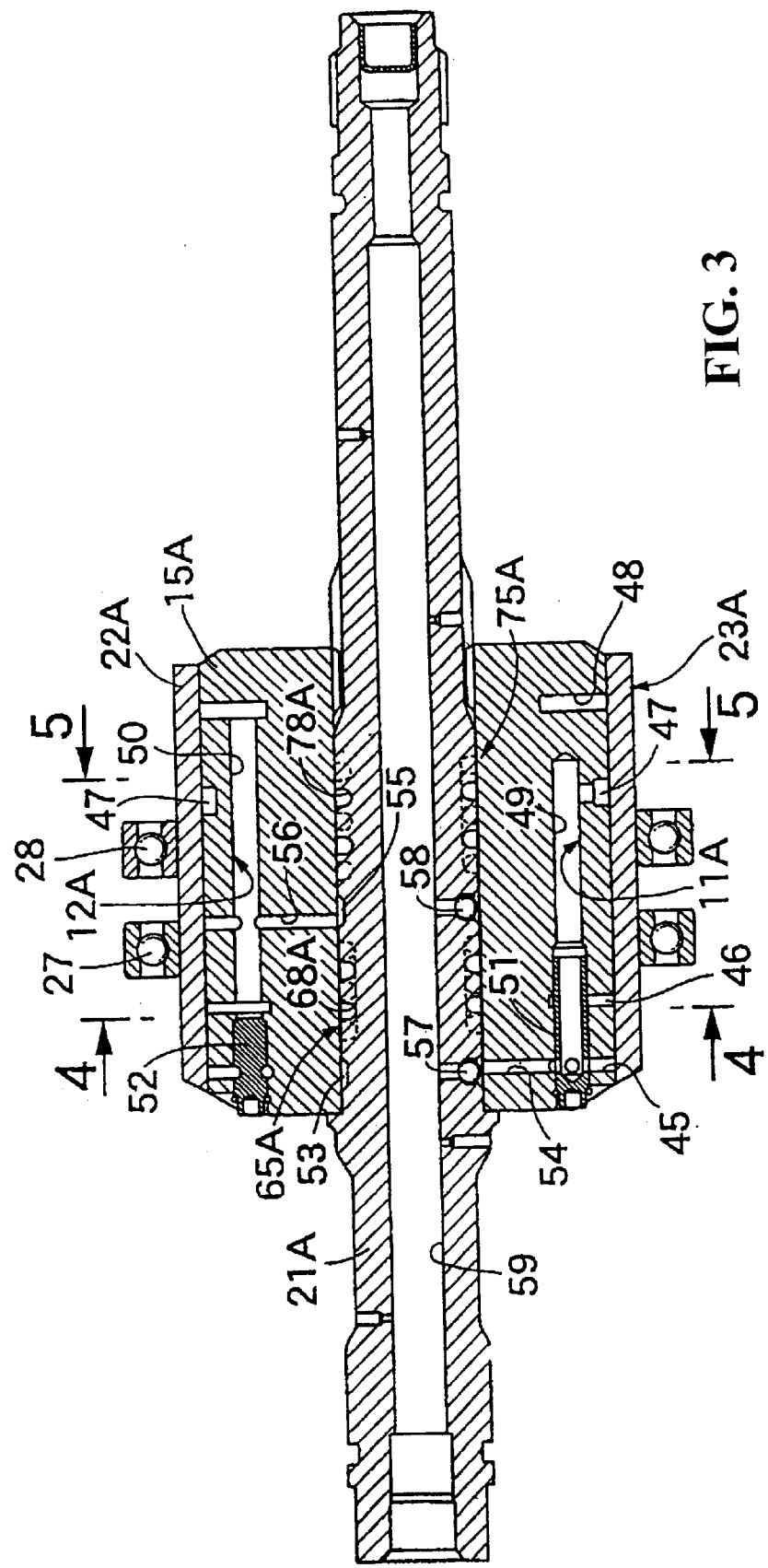
FIG. 3 is a cross-sectional view taken along line 3—3 of FIG. 2.
Figure 4:
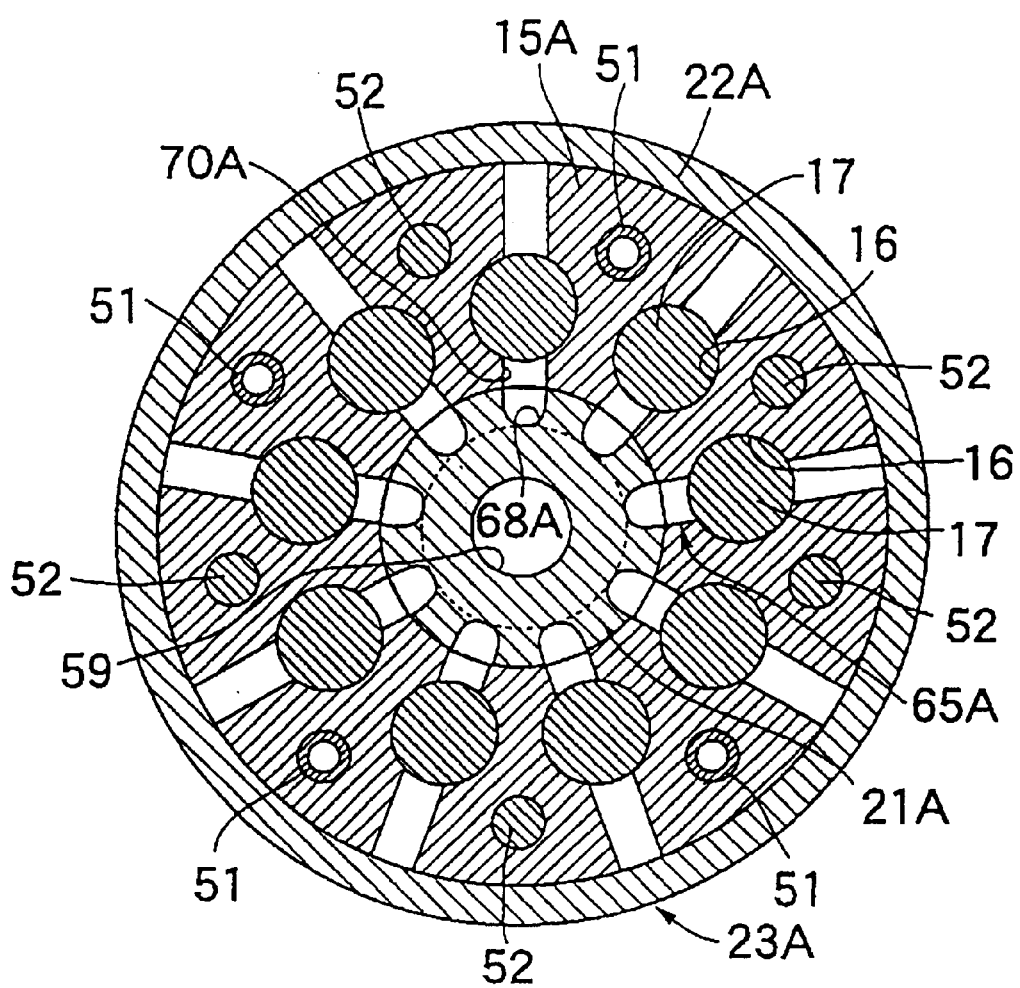
FIG. 4 is a cross-sectional view taken along line 4—4 of FIG. 3.
Figure 5:
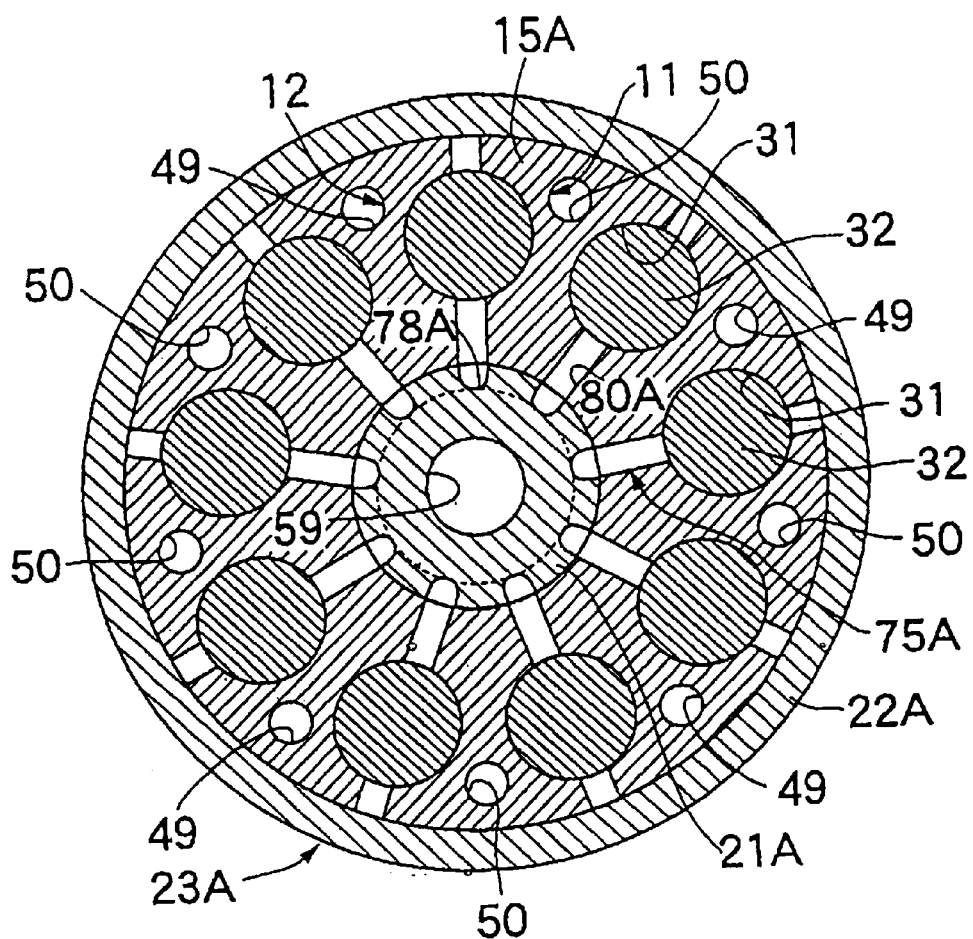
FIG. 5 is a cross-sectional view taken along line 5—5 of FIG. 3.

In FIG. 1, in the hydrostatic type continuously variable transmission, a swash plate type fixed displacement hydraulic pump PA as a swash plate type hydraulic drive transmission and a swash plate type variable displacement hydraulic motor MA as another swash plate type hydraulic drive transmission are connected via a low pressure oil passage 11A and a high pressure oil passage 12A to construct a hydraulic closed circuit.

The hydraulic pump PA has an input cylindrical shaft 14 is provided in its outer circumference with a gear 13 to which power from a power source such as an engine, not shown, is transmitted. A cylinder block 15A is arranged coaxially of the input cylindrical shaft 14 so as to be covered in part. A plurality of pump plungers 17 are slidably fitted respectively in a plurality of bottomed pump cylinder holes 16 provided in the cylinder block 15A in an annular arrangement so as to surround its rotation axis. A pump swash plate 18, having a protruding end from the cylinder block 15A of the pump plungers 17, is brought into contact and engaged so as to be supported by the input cylindrical shaft 14.

An angular contact bearing 19 and a ball bearing 20 are interposed between the pump swash plate 18 and the input cylindrical shaft 14. The pump swash plate 18 is relatively, rotatably supported by the input cylindrical shaft 14 so as to hold a posture tilted at a fixed angle to the axis of the cylinder block 15A. The pump swash plate 18 can repeat suction and discharge strokes by giving a reciprocating motion to the pump plungers 17 when the input cylindrical shaft 14 is rotated.

The cylinder block 15A is in common with the hydraulic pump PA and the hydraulic motor MA. A rotor 23A is constructed by the cylinder block 15A, a rotation axis 21A is coaxially pressed into the cylinder block 15A, and a cylindrical member 22A is fixed by shrink fit or press fit in the outer circumference of the cylinder block 15A. The rotor 23A is supported in a casing 26 to be rotatable about the axis of the cylinder block 15A.

An angular contact bearing 24 is interposed between one end of the rotation axis 21A and the input cylindrical shaft 14. An angular contact bearing 25 is interposed between the other end of the rotation axis 21A and the casing 26. A ball bearing 27 is interposed between the cylindrical member 22A and the input cylindrical shaft 14. A ball bearing 28 is interposed between the cylindrical member 22A and the casing 26.

The hydraulic motor MA includes the cylinder block 15A, a plurality of motor plungers 32 that are slidably fitted respectively in a plurality of bottomed motor cylinder holes 31 and provided in the cylinder block 15A in an annular arrangement so as to surround its rotation axis. A motor swash plate 33 includes an end protruding from the cylinder block 15A of the motor plungers 32 that is brought into contact and engaged. A swash plate holder 34 is provided for supporting the motor swash plate 33 via an angular contact bearing 36 and a ball bearing 37. A swash plate anchor 35 is provided in the casing 26 so as to support the back surface of the swash plate holder 34.

The number of the motor cylinder holes 31 and the motor plungers 32 of the hydraulic motor MA is set to an odd number equal to the number of the pump cylinder holes 16 and the pump plungers 17 of the hydraulic pump PA, for example, nine. The motor cylinder holes 31 and the motor plungers 32, and the pump cylinder holes 16 and the pump plungers 17 are arranged to be mutually shifted axially of the cylinder block 15A at the same angular position along the circumferential direction of the cylinder block 15A.

Opposite contact surfaces 34a and 35a of the swash plate holder 34 and the swash plate anchor 35 are formed in a spherical shape centering on the intersecting point of the rotation axis and the trunnion axis O of the cylinder block 15A. The swash plate holder 34 can be rotated about the trunnion axis O to be supported by the swash plate anchor 35.

A screw axis 38 includes an axis in parallel with the rotation axis 21A that is rotatably supported in the casing 26 via ball bearings 42 and 43. A nut 40 is threadedly engaged with the screw axis 38 and is coupled to a coupling arm 34b provided in the swash plate holder 34 via a coupling pin 41 having an axis in parallel with the trunnion axis O. Onto one end portion of the screw axis 38, a gear 39 for transmitting power from a power source, not shown, to the screw axis 38 is fixed.

The swash plate holder 34 is rotated about the trunnion axis O corresponding to rotation of the screw axis 38. The motor swash plate 33 is operated between an upright position at right angles to the axis of the cylinder block 15A and a maximum tilt position tilted at a certain angle. The motor swash plate 33 in a tilted state gives a reciprocating motion to the motor plungers 32 with rotation of the cylinder block 15A to repeat expansion and reduction strokes.

Referring to FIGS. 2 to 5, on the hydraulic pump PA side, the cylinder block 15A is provided in its outer circumference with first low pressure and high pressure annular recesses 45 and 46. On the hydraulic motor MA side, the cylinder block 15A is provided in its outer circumference with second low pressure and high pressure annular recesses 47 and 48. The annular recesses 45 to 48 are covered by the cylindrical member 22A. Between the pump cylinder holes 16 and the motor cylinder holes 31, the cylinder block 15A is provided with four low pressure side communication passages 49 extended in parallel with the rotation axis 21A from one end of the cylinder block 15A to a position corresponding to the second low pressure annular recess 47. Between the pump cylinder holes 16 and the motor cylinder holes 31, with a remaining five positions not provided with the low pressure side communication passages 49, the cylinder block 15A is provided with high pressure side communication passages 50 extended in parallel with the rotation axis 21A from one end of the cylinder block 15A to the second high pressure annular recess 48.

One end of the low pressure side communication passages 49 is closed in liquid-tight manner by low pressure plugs 51 pressed into the cylinder block 15A. The low pressure plugs 51 are formed in a bottomed cylindrical shape so as to allow the first low pressure annular recess 45 to be in communication with the low pressure side communication passages 49 and to block communication of the first high pressure annular recess 46 to the low pressure side communication passages 49. The second low pressure annular recess 47 is in communication with the inner end of the low pressure side communication passages 49.

One end of the high pressure side communication passages 50 is closed in a liquid-tight manner by high pressure plugs 52 pressed into the cylinder block 15A. The high pressure plugs 52 are formed to block communication of the first low pressure annular recess 45 to the high pressure side communication passages 50. The first and second high pressure annular recesses 46 and 48 are in communication with the high pressure side communication passages 50. The depth of the second low pressure annular recess 47 is set so as not to be in communication with the high pressure side communications passages 50.

The low pressure oil passage 11A has the first low pressure annular recess 45, the low pressure side communication passages 49, and the second low pressure annular recess 47. The high pressure oil passage 12A has the first high pressure annular recess 46, the high pressure side communication passages 50, and the second high pressure annular recess 48.

In a portion to arrange the low pressure plugs 51, the cylinder block 15A is provided with low pressure side supply passages 54 to allow a first annular passage 53 formed between the cylinder block 15A and the rotation axis 21A to be in communication with the first low pressure annular recess 45 so as to extend in the radial direction of the cylinder block 15A. In a portion to arrange the high pressure plugs 52, the cylinder block 15A is provided with high pressure side supply passages 56 to allow a second annular passage 55, formed between the cylinder block 15A and the rotation axis 21A, to be in communication with the high pressure side communication passages 50 so as to extend in the radial direction of the cylinder block 15A. The outer end of the high pressure side supply passages 56 is closed by the cylindrical member 22A.

The rotational axis 21A is provided coaxially with a supply oil passage 59 to which working fluid is supplied from a pump, not shown. A check valve 57 interposed between the supply oil passage 59 and the first annular passage 53 and a check valve 58 interposed between the supply oil passage 59 and the second annular passage 55 are mounted in the outer circumferential portion of the rotation axis 21A.

In the hydraulic pump PA, pump oil chambers 61 are formed between the closed end of the pump cylinder holes 16 and the pump plungers 17. In the hydraulic motor MA, motor oil chambers 62 are formed between the closed end of the motor cylinder holes 31 and the motor plungers 32.

A plurality of first distributing valves 63A for allowing the pump oil chambers 61 of the pump plungers 17 in a suction region to be in communication with the low pressure oil passage 11A and for allowing the pump oil chambers 61 of the pump plungers 17 in a discharge region to be in communication with the high pressure oil passage 12A are provided corresponding to the pump plungers 17 between the low pressure oil passage 11A and the high pressure oil passage 12A and the pump oil chambers 61. A plurality of second distributing valves 64A for allowing the motor oil chambers 62 of the motor plungers 32 in an expansion region to be in communication with the high pressure oil passage 12A and which allow the motor oil chambers 62 of the motor plungers 32 in a reduction region to be in communication with the low pressure oil passage 11A are provided corresponding to the motor plungers 32 between the low pressure oil passage 11A and the high pressure oil passage 12A and the motor oil chambers 62.

Figure 6:
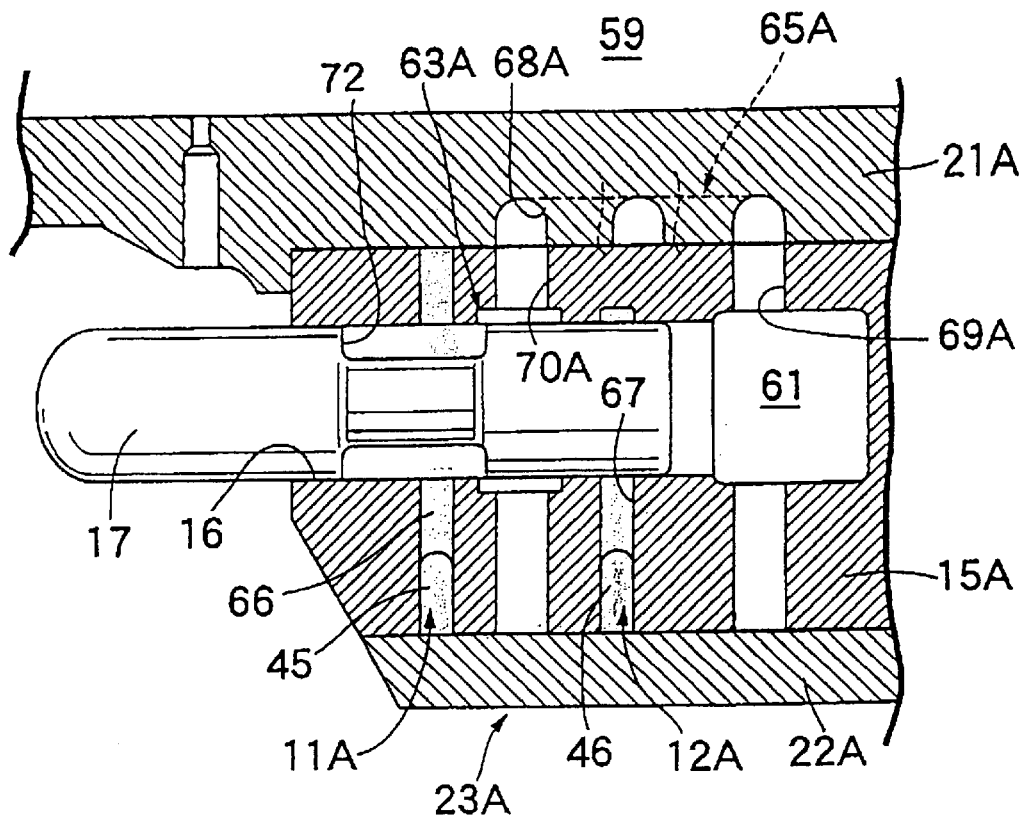
FIG. 6 is an enlargement view of an arrow indicating part 6 of FIG. 1.

In FIG. 6, when the first distributing valves 63A alternately switch, corresponding to the axial reciprocating motion of the pump plungers 17, communication and cutoff of communication between a plurality of pump side communication passages 65A in communication with the pump oil chambers 61 opening to the inner surface of the pump cylinder holes 16 and a plurality of first low pressure and high pressure ports 66A and 67A respectively communicate with the low pressure oil passage 11A and the high pressure oil passage 12A opening to the inner surface of the pump cylinder holes 16.

The first low pressure ports 66A extend inwardly in the radial direction of the cylinder block 15A from the first low pressure annular recess 45 in the low pressure oil passage 11A to be opened to the inner surface of the pump cylinder holes 16. The first high pressure ports 67A extend inwardly in the radial direction of the cylinder block 15A from the first high pressure annular recess 46 in the high pressure oil passage 12A to be opened to the inner surface of the pump cylinder holes 16.

The pump side communication passages 65A have pump side communication grooves 68A provided in the outer circumferential surface of the rotation axis 21A, passages 69A radially drilled in the cylinder block 15A so as to allow one end of the pump side communication grooves 68A to be respectively communicated with the pump oil chambers 61, and passages 70A radially drilled in the cylinder block 15A between the first low pressure and high pressure ports 66A and 67A to be in communication with the other end of the pump side communication grooves 68A opening to the inner surface of the pump cylinder holes 16. The outer end of the passages 69A and 70A is closed by the cylindrical member 22A.

Figure 7:
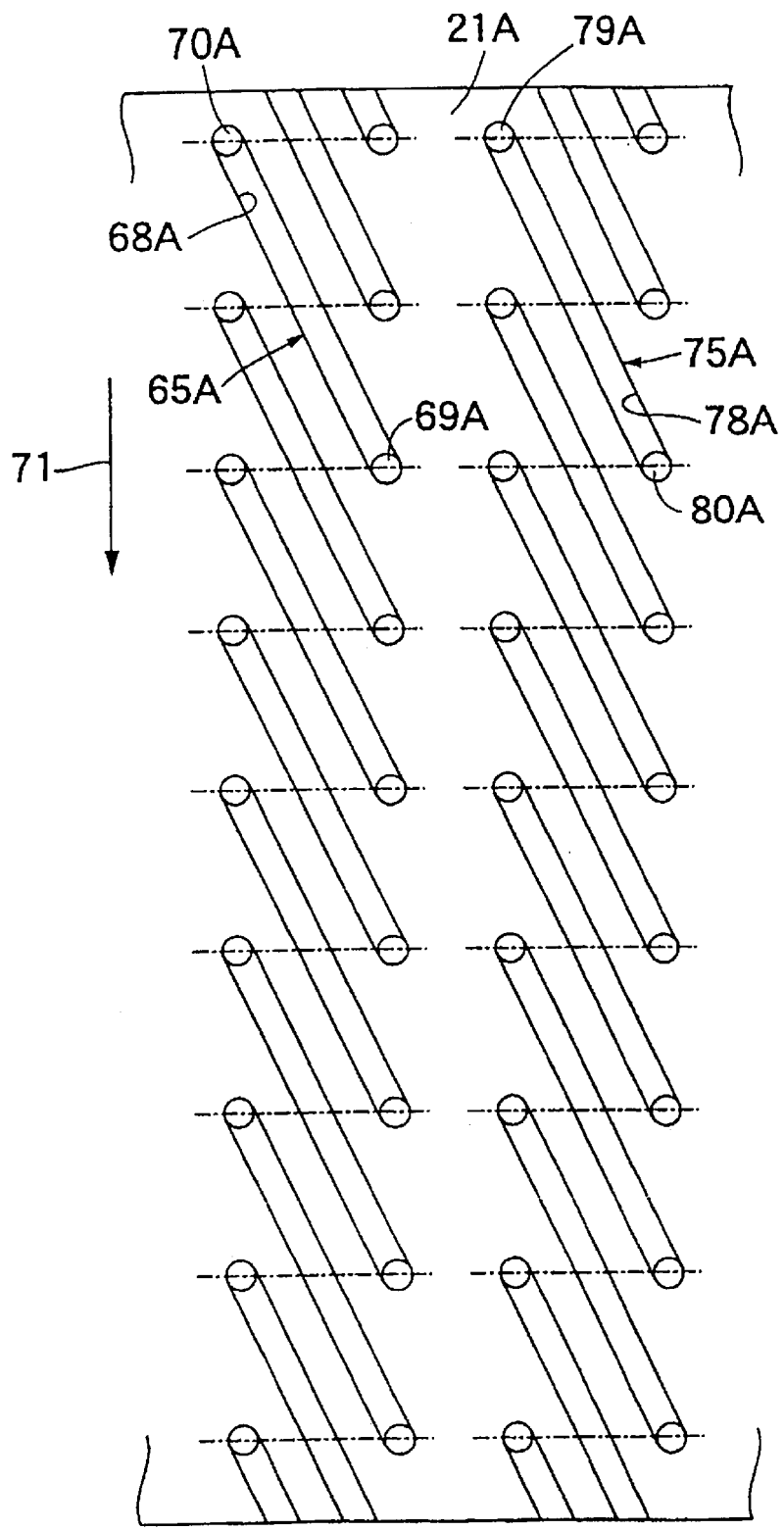
FIG. 7 is a view illustration the development of the outer circumferential surface of a rotation axis in the circumferential direction.

In FIG. 7, the pump side communication grooves 68A are formed helically so that with respect to the position of the passages 69A communicated to one end thereof, the position of the passages 70A communicated to the other end is shifted in the reverse direction, for example, 80° to a rotating direction 71 of the rotation axis 21A and the cylinder block 15A and are formed in the outer circumferential surface of the rotation axis 21A by rolling.

The other end of the pump side communication passage 65A whose one end is communicated to the pump oil chamber 61 is arranged in the inner surface of the pump cylinder hole 16 shifted in the reverse direction, for example, 80° to the rotating direction 71 of the rotation axis 21A and the cylinder block 15A so as to be opened in the middle portion between the first low pressure port 66A and the first high pressure port 67A. In the outer circumference of the middle portion axially of the pump plungers 17, annular recesses 72 for switching communication and cutoff between the pump side communication passages 65A and the first low pressure and high pressure ports 66A and 67A are provided.

Figure 8:
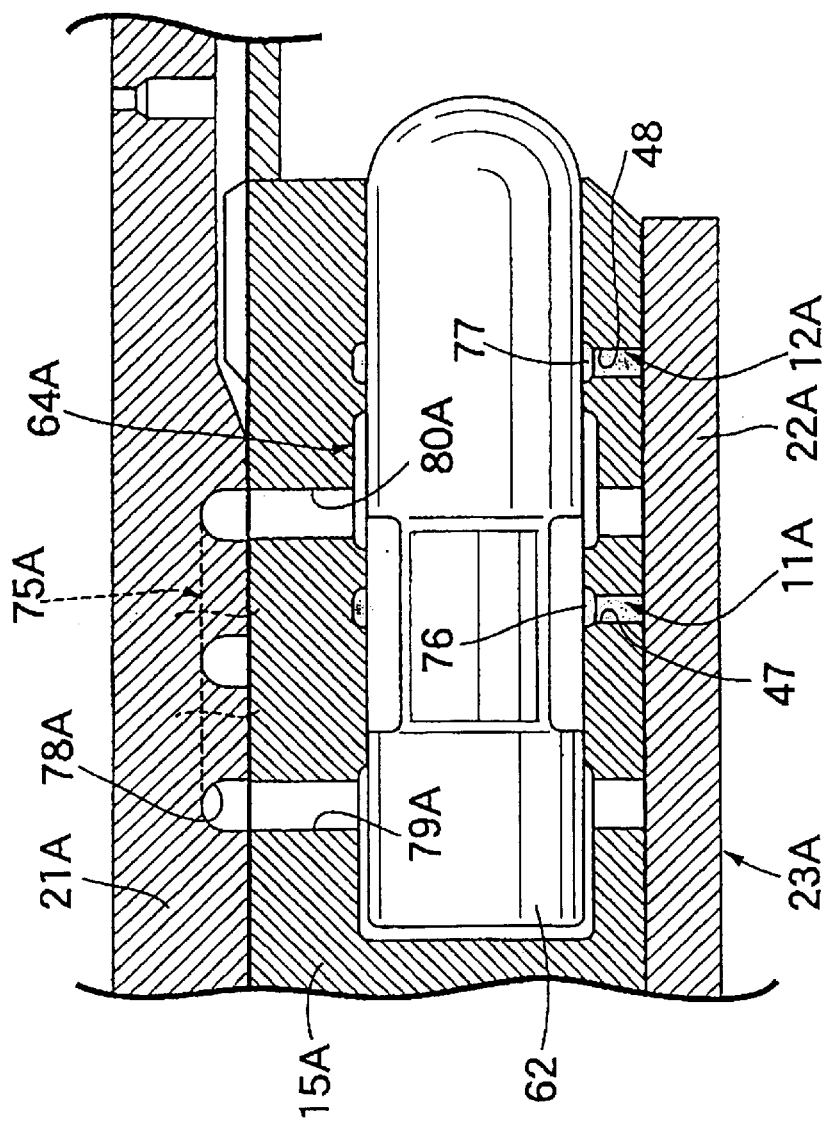
FIG. 8 is an enlargement view of an arrow indicating part 8 of FIG. 1.

In FIG. 8, when the second distributing valves 64A alternately switch, corresponding to the axial reciprocating motion of the motor plungers 32, communication and cutoff of communication between motor side communication passages 75A communicated to the motor oil chambers 62 opening to the inner surface of the motor cylinder holes 31 and second low pressure and high pressure ports 76A and 77A respectively communicated to the low pressure oil passage 11A and the high pressure oil passage 12A opening to the inner surface of the motor cylinder holes 31 occurs.

The second low pressure ports 76A are formed to be opened to the inner surface of the motor cylinder holes 31 so that the motor cylinder holes 31 are across part of the second low pressure annular recess 47 in the low pressure oil passage 11A. The second high pressure ports 77A are formed to be opened to the inner surface of the motor cylinder holes 31 so that the motor cylinder holes 31 are across part of the second high pressure annular recess 48 in the high pressure oil passage 12A.

The motor side communication passages 75A have motor side communication grooves 78A provided in the outer circumferential surface of the rotation axis 21A, passages 79A radially drilled in the cylinder block 15A so as to allow one end of the motor side communication grooves 78A to be communicated to the motor oil chambers 62, and passages 80A radially drilled in the cylinder block 15A between the second low pressure and high pressure ports 76A and 77A to be in communication with the other end of the motor side communication grooves 78A opening to the inner surface of the motor cylinder holes 31. The outer end of the passages 79A and 80A is closed by the cylindrical member 22A.

In FIG. 7, the motor side communication grooves 78A are formed helically so that with respect to the position of the passages 79A communicated to one end thereof, the position of the passages 80A communicated to the other end is shifted in the reverse direction, for example, 80° to the rotating direction 71 of the rotational axis 21A and the cylinder block 15A and are formed on the outer circumferential surface of the rotation axis 21A by rolling.

The other end of the motor side communication passage 75A whose one end is communicated to the motor oil chamber 62 is arranged in the inner surface of the motor cylinder hole 31 shifted in the reverse direction, for example, 80° to the rotating direction 71 of the rotation axis 21A and the cylinder block 15A so as to be opened in the middle portion between the second low pressure port 76A and the second high pressure port 77A. In the outer circumference of the middle portion axially of the motor plungers 32, annular recesses 82 are provided for switching communication and cutoff of communication between the motor side communication passages 75A and the second low pressure and high pressure ports 76A and 77A.

The operation of the first embodiment will be described. While the motor swash plate 33 is held at a tilt angle, engine power, not shown, is transmitted to the input cylindrical shaft 14 of the hydraulic pump PA. The pump swash plate 18 supported by the input cylindrical shaft 14 provides a reciprocating motion to the pump plungers 17.

Figure 9:
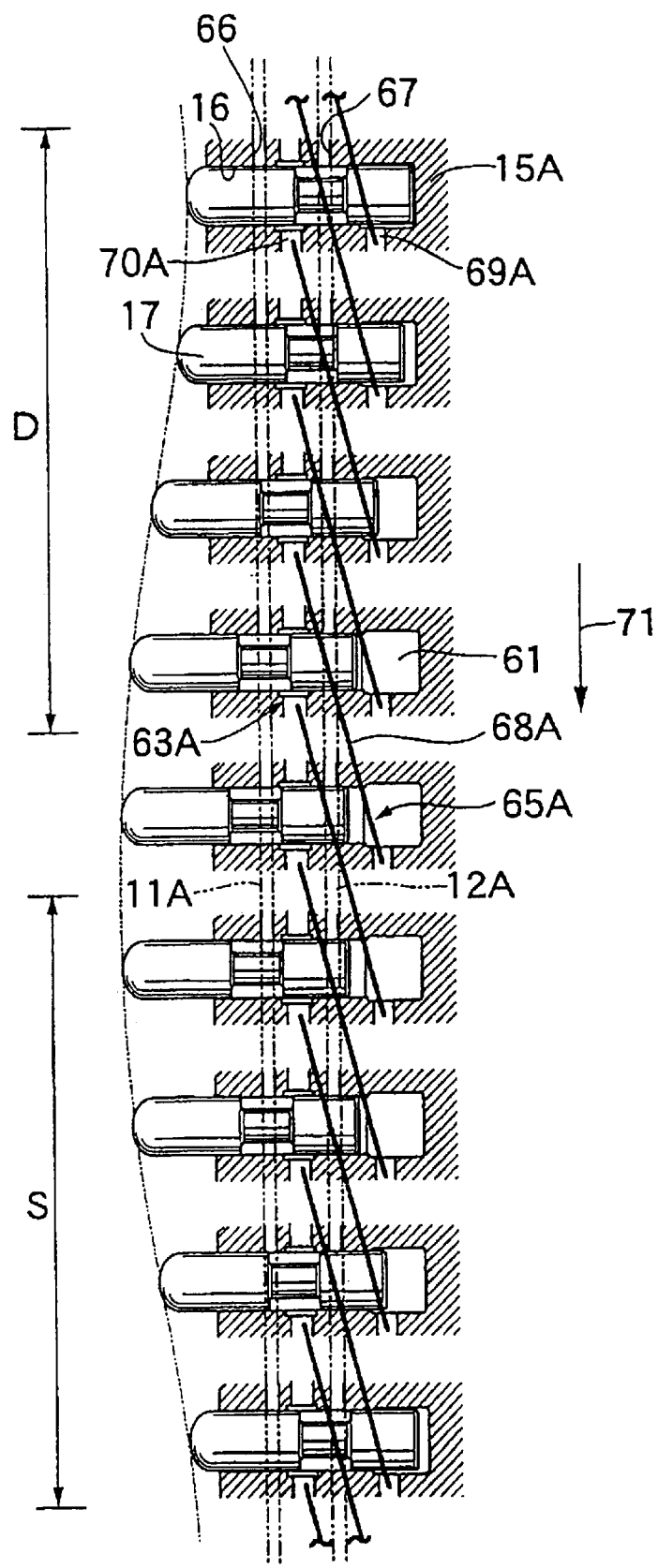
FIG. 9 is a diagram showing the operational timing of the pump plungers.

As shown in FIG. 9, while the pump plungers 17 pass through the discharge region D to reduce the volume of the pump oil chambers 61, the first distributing valves 63A allow the pump oil chambers 61 to be communicated to the high pressure oil passage 12A. The working fluid from the pump oil chambers 61 is discharged to the high pressure oil passage 12A. While the pump plungers 17 pass through the suction region S to expand the volume of the pump oil chambers 61, the first distributing valves 63A allow the pump oil chambers 61 to be communicated to the low pressure oil passage 11A. The working fluid from the low pressure oil passage 11A is suctioned into the pump oil chamber 61.

Figure 10:
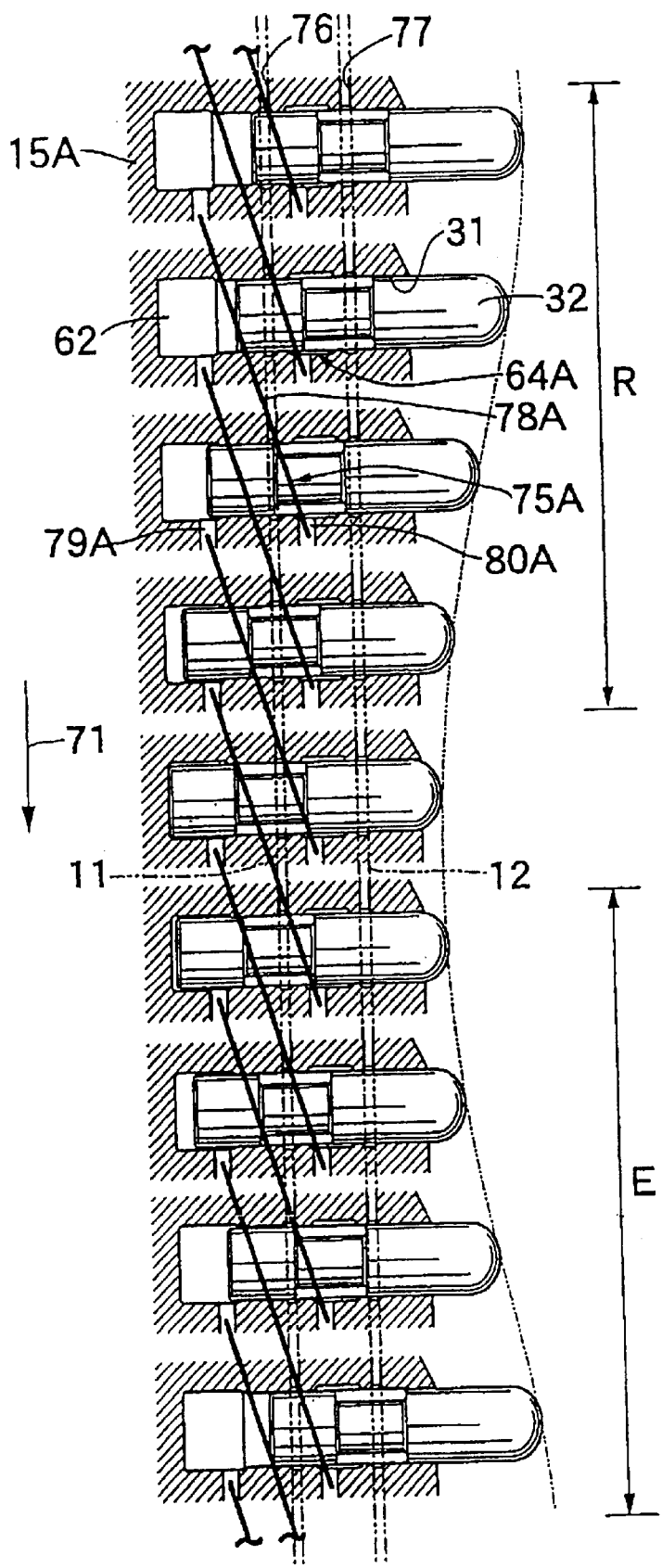
FIG. 10 is a diagram showing the operational timing of the motor plungers.

In the hydraulic motor MA, as shown in FIG. 10, while the motor plungers 32 are present in the expansion region E to expand the volume of the motor oil chambers 62, the second distributing valves 64A allows the motor oil chambers 62 to be in communication with the high pressure oil passage 12A, and while the motor plungers 32 are present in the reduction region R to reduce the volume of the motor oil chambers 62, the second distributing valves 64A allow the motor oil chambers 62 to be communicated to the low pressure oil passage 11A. For this reason, the high pressure working fluid discharged from the pump oil chambers 61 of the hydraulic pump PA to the high pressure oil passage 12A is supplied to the motor oil chambers 62 of the motor plungers 32 present in the expansion region E to give a thrust force to the motor plungers 32. The motor plungers 32 present in the reduction region R discharge the working fluid from the motor oil chambers 62 to the low pressure oil passage 11A corresponding to the proceeding of the reduction stroke.

The motor plungers 32 receiving the thrust force by the high pressure working fluid of the motor oil chambers 62 are pressed against the motor swash plate 33 to exert rotating torque. The rotor 23A including the cylinder block 15A is rotated in the same direction as that of the input cylindrical shaft 14 by the reaction torque. The rotating torque of the rotor 23A is transmitted from the rotation axis 21A to a load, not shown.

The hydraulic pump PA is of a fixed displacement type. The hydraulic motor MA is of a variable displacement type which varies the tilt angle of the motor swash plate 33. The tilt angle of the motor swash plate 33 is varied to increase and decrease the displacement of the hydraulic motor MA. The gear ratio between the input cylindrical shaft 14 and the rotational axis 21A can be varied continuously.

Such a hydrostatic type continuously variable transmission has the first distributing valves 63A which switch, by the reciprocatively operated pump plungers 17, for communication and for cutoff of communication between the pump side communication passages 65 communicated to the pump oil chambers 61 and the first low pressure and high pressure ports 66A and 67A respectively communicated to the low pressure oil passage 11A and the high pressure oil passage 12A, and the second distributing valves 64A which switch, by the reciprocatively operated motor plungers 32, communication and cutoff of communication between the motor side communication passages 75A communicated to the motor oil chambers 62 and the second low pressure and high pressure ports 76A and 77A respectively communicated to the low pressure oil passage 11A and the high pressure oil passage 12A.

The sliding holes only for the first and second distributing valves 63A and 64A need not be provided in the cylinder block 15A. The cylinder block 15A can be made smaller according to the unrequired sliding holes and the number of processes can be reduced. The parts only for the first and second distributing valves 63A and 64A are unnecessary to reduce the number of parts.

Part of the pump side communication passages 65A and part of the motor side communication passages 75A are constructed by the pump side and motor side communication grooves 68A and 78A provided in the outer circumference of the rotational axis 21A coaxially pressed into the cylinder block 15A. The pump side communication grooves 68A and the motor side communication grooves 78A are easily formed in the outer circumferential surface of the rotation axis 21A. Thus, the number of processes can be further reduced.

The cylindrical member 22A is fixed by shrink fit or press fit in the outer circumference of the cylinder block 15A. Brazing is unnecessary to contribute to reduction of the manufacturing cost.

The cylindrical member 22A seals the outer end opening portion of the first and second low pressure annular recesses 45 and 47 constructing part of the low pressure oil passage 11A and the first and second high pressure annular recesses 46 and 48 constructing part of the high pressure oil passage 12A. A shrink fit portion or a press fit portion between the cylindrical member 22A and the cylinder block 15A is correctly determined. When the oil pressure of the low pressure oil passage 11A or the high pressure oil passage 12A is excessive, the working fluid is released from between the cylinder block 15A and the cylindrical member 22A. The cylindrical member 22A can serve as the function of a pressure limiter. No pressure-regulating valves are thus required.

Figure 11:
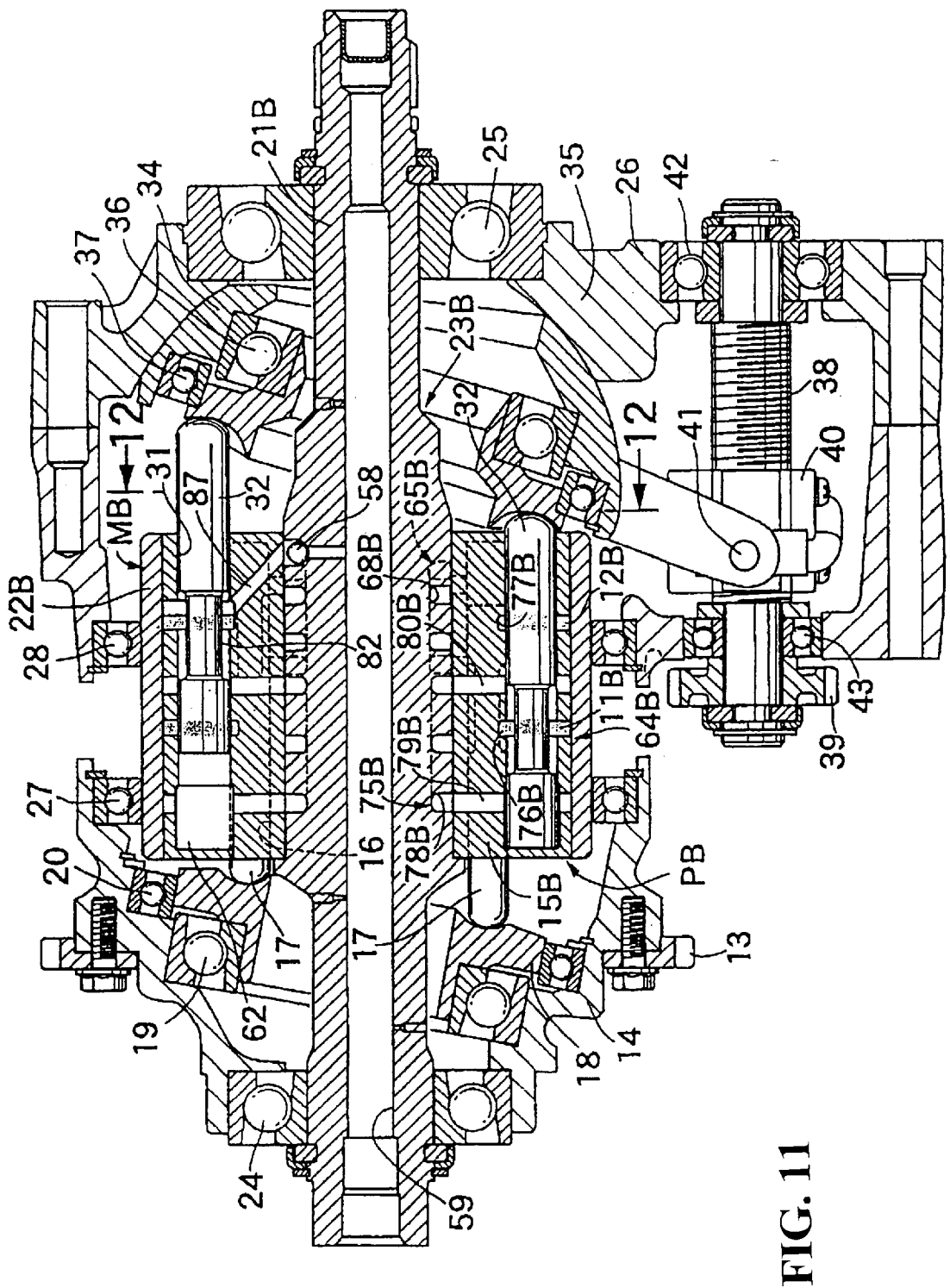
FIG. 11 is a longitudinal sectional view of a hydrostatic type continuously variable transmission according to a second embodiment and a cross-sectional view taken along line 11—11 of FIG. 12.
Figure 12:
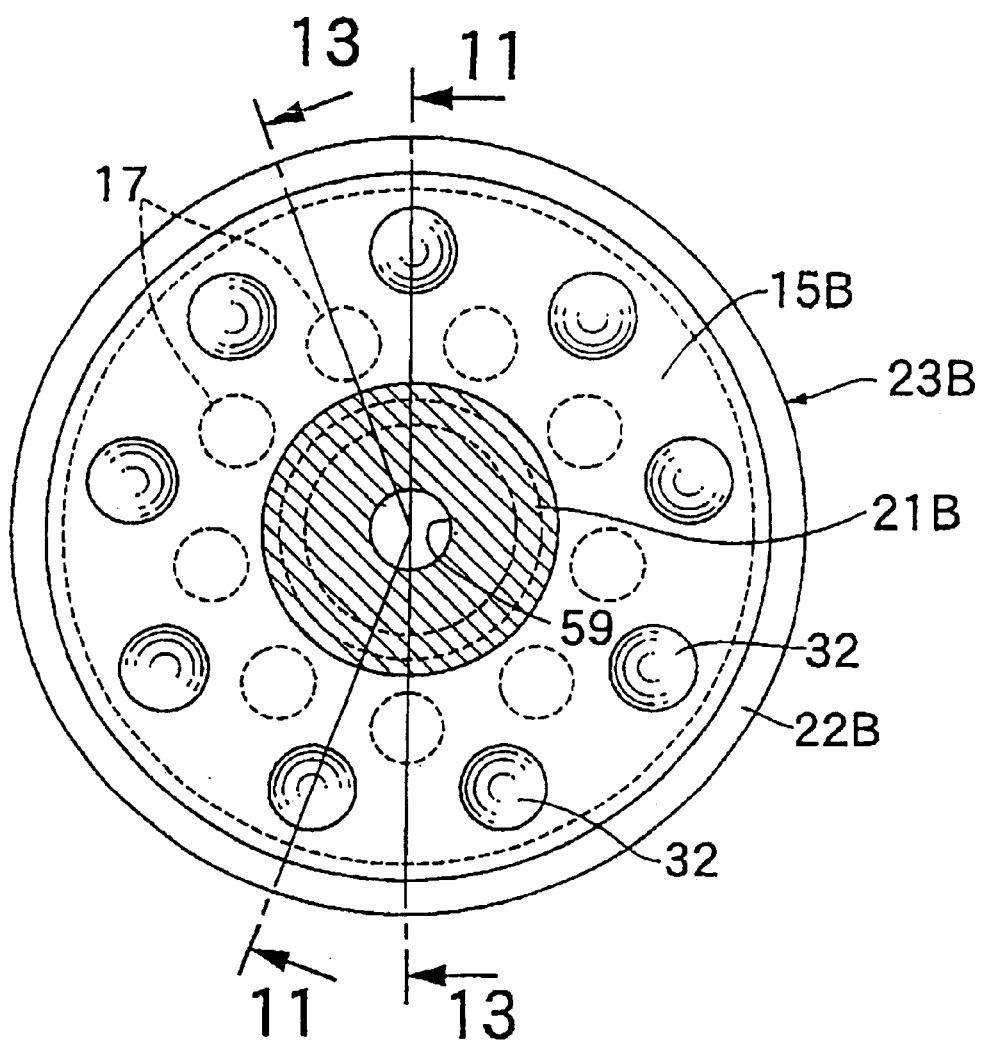
FIG. 12 is a cross-sectional view of a rotor viewed in the arrow direction of line 12—12 of FIG. 11.
Figure 13:
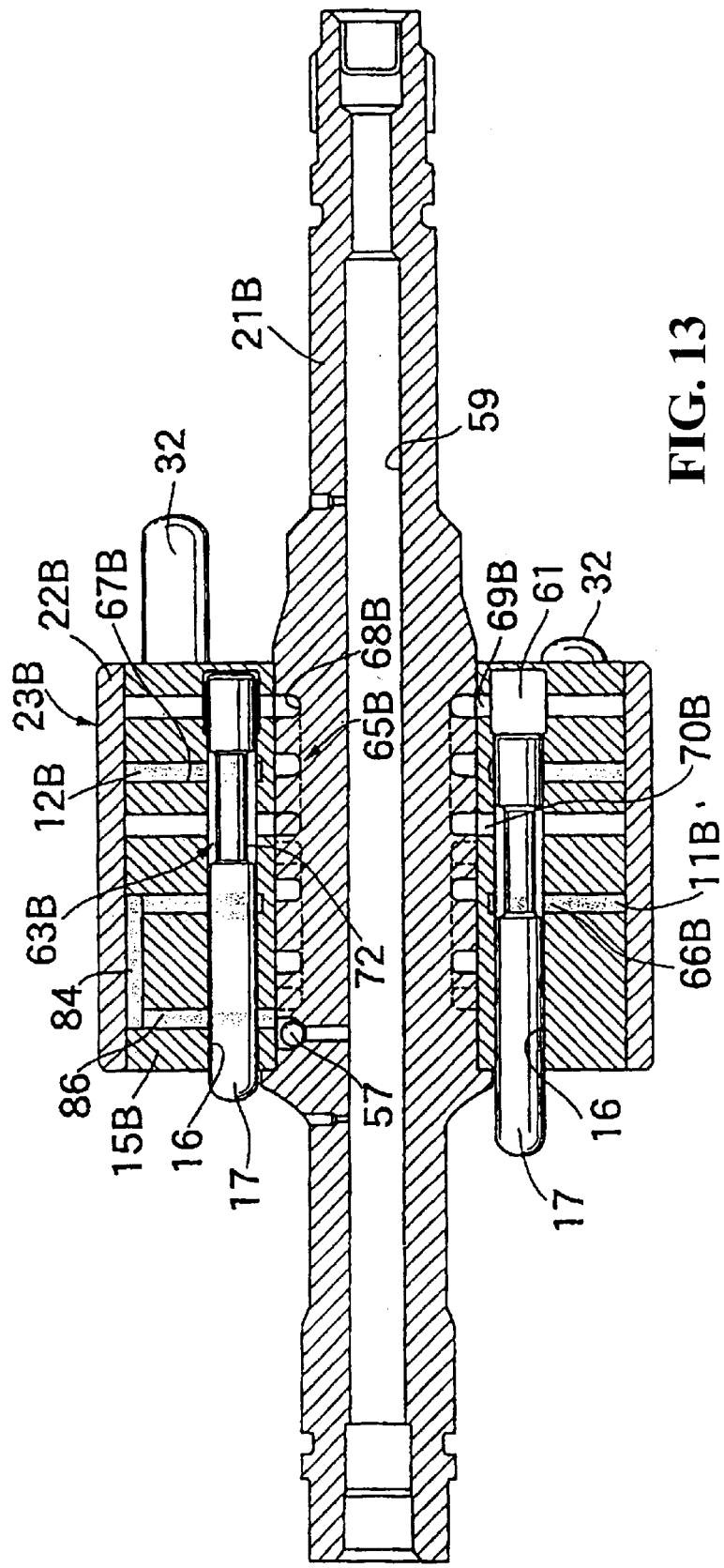
FIG. 13 is a cross-sectional view taken along line 13—13 of FIG. 12.

FIG. 11 is a longitudinal sectional view of a hydrostatic type continuously variable transmission of a second embodiment of the present invention and is a cross-sectional view taken along line 11—11 of FIG. 12. FIG. 12 is a cross-sectional view of a rotor viewed in the arrow direction of line 12—12 of FIG. 11. FIG. 13 is a cross-sectional view taken along line 13—13 of FIG. 12. Parts corresponding to the first embodiment are indicated by the same reference numerals, and the detailed description thereof is omitted.

In the hydrostatic type continuously variable transmission, a swash plate type fixed displacement hydraulic pump PB and a swash plate type variable displacement hydraulic motor MB are connected via a low pressure oil passage 11B and a high pressure oil passage 12B to construct a hydraulic closed circuit.

A rotor 23B is constructed by the cylinder block 15B in common with the hydraulic pump PB and the hydraulic motor MB, a rotational axis 21B, coaxially pressed into the cylinder block 15B, and a cylindrical member 22B are fixed by shrink fit or press fit in the outer circumference of the cylinder block 15B. The rotor 23B is supported in a casing 26 so as to be rotatable about the axis of the cylinder block 15B and the rotation axis 21B.

The hydraulic pump PB has a plurality of, for example, nine pump plungers 17 The pump plungers 17 are slidably fitted respectively in bottomed pump cylinder holes 16 provided in an annular arrangement in a portion inwardly in the radial direction of the cylinder block 15B. The outer end of the pump plungers 17 is brought into contact with and engaged with a pump swash plate 18.

The hydraulic motor MB has a plurality of, for example, nine motor plungers 32. The motor plungers 32 are slidably fitted respectively in bottomed motor cylinder holes 31 provided in an annular arrangement in a portion outwardly in the radial direction of the cylinder block 15B. The outer end of the motor plungers 32 is brought into contact with and engaged with a motor swash plate 33. The motor cylinder holes 31 are mutually arranged between the pump cylinder holes 16 along the circumferential direction of the cylinder block 15B.

In the rotor 23B, the annular low pressure oil passage 11B and the annular high pressure oil passage 12B are formed in positions spaced along the axial direction of the rotor 23B.

Between the outer circumference of the cylinder block 15B and the cover 22B, a low pressure side supply passage 84 extending in parallel with the rotation axis 21B is provided so that its one end is in communication with the low pressure oil passage 11B. The other end of the low pressure side supply passage 84 is in communication with a low pressure side supply passage 86 provided in the cylinder block 15B so as to extend in the radial direction of the cylinder block 15B. In the cylinder block 15B, a high pressure side supply passage 87 includes one end thereof opened in the inner circumference of the cylinder block 15B and the other end in communication with the high pressure oil passage 12B.

On the rotational axis 21B are mounted a check valve 57 interposed between a supply oil passage 59 in the rotation axis 21B and the low pressure side supply passage 86 and a check valve 58 interposed between the supply oil passage 59 and the high pressure side supply passage 87.

A plurality of first distributing valves 63B which allow pump oil chambers 61 of the pump plungers 17 in the suction region to be in communication with the low pressure oil passage 11B and which allow the pump oil chambers 61 of the pump plungers 17 in the discharge region to be in communication with the high pressure oil passage 12B are provided corresponding to the pump plungers 17 between the low pressure oil passage 11B and the high pressure oil passage 12B and the pump oil chambers 61 formed between the closed end of the pump cylinder holes 16 and the pump plungers 17. A plurality of second distributing valves 64B which allow motor oil chambers 62 of the motor plungers 32 in the expansion region to be in communication with the high pressure oil passage 12B and which allow the motor oil chambers 62 of the motor plungers 32 in the reduction region to be in communication with the low pressure oil passage 11B are provided that correspond to the pump plungers 32 between the low pressure oil passage 11B and the high pressure oil passage 12B and the motor oil chambers 62 formed between the closed end of the motor cylinder holes 31 and the motor plungers 32.

The first distributing valves 63B alternately switch, corresponding to the axial reciprocating motion of the pump plungers 17 each having an annular recess 72, to provide communication and to cutoff communication between a plurality of pump side communication passages 65B communicated to the pump oil chambers 61 opening to the inner surface of the pump cylinder holes 16 and a plurality of first low pressure and high pressure ports 66B and 67B respectively in communication with the low pressure oil passage 11B and the high pressure oil passage 12B opening to the inner surface of the pump cylinder holes 16.

The first low pressure ports 66B are formed so as to be opened to the inner surface of the pump cylinder holes 16 so that the pump cylinder holes 16 are across the low pressure oil passage 11B. The first high pressure ports 67B are formed so as to be opened to the inner surface of the pump cylinder holes 16 so that the pump cylinder holes 16 are across the high pressure oil passage 12B.

The pump side communication passages 65B have pump side communication grooves 68B provided in the outer circumferential surface of the rotational axis 21B, passages 69B radially drilled in the cylinder block 15B so as to allow one end of the pump side communication grooves 68B to be respectively communicated to the pump oil chambers 61, and passages 70B radially drilled in the cylinder block 15B between the first low pressure and high pressure ports 66B and 67B to be communicated to the other end of the pump side communication grooves 68B opening to the inner surface of the pump cylinder holes 16.

The pump side communication grooves 68B are formed helically as in the first embodiment and are formed in the outer circumferential surface of the rotation axis 21B by rolling.

The second distributing valves 64B alternately switch, corresponding to the axial reciprocating motion of the motor plungers 32 each having an annular recess 82, communication and cutoff between motor side communication passages 75B communicated to the motor oil chambers 62 opening to the inner surface of the motor cylinder holes 31 and second low pressure and high pressure ports 76B and 77B respectively in communication with the low pressure oil passage 11B and the high pressure oil passage 12B opening to the inner surface of the motor cylinder holes 31.

The second low pressure ports 76B are formed so as to be opened to the inner surface of the motor cylinder holes 31 so that the motor cylinder holes 31 are across the low pressure oil passage 11B. The second high pressure ports 77B are formed so as to be opened to the inner surface of the motor cylinder holes 31 so that the motor cylinder holes 31 are across the high pressure oil passage 12B.

The motor side communication passages 75B have motor side communication grooves 78B provided in the outer circumferential surface of the cylinder block 15B, passages 79B radially drilled in the cylinder block 15B so as to allow one end of the motor side communication grooves 78B to be respectively in communication with the motor oil chambers 62, and passages 80B radially drilled in the cylinder block 15B between the second low pressure and high pressure ports 76B and 77B to be in communication with the other end of the motor side communication grooves 78B opening to the inner surface of the motor cylinder holes 31.

The motor side communication grooves 78B are formed helically as in the first embodiment and are formed in the outer circumferential surface of the rotational axis 21B by rolling.

The second embodiment can provide the same effect as the first embodiment and make the cylinder block 15B smaller. The sliding holes only for the first and second distributing valves 63B and 64B need not be provided in the cylinder block 15B. The diameter of the cylinder block 15B is prevented from being increased in size. The pump plungers 17 and the motor plungers 32 can be in an annular arrangement to be shifted in the circumferential direction and in the radial direction of the cylinder block 15B. The axial length of the cylinder block 15B can be reduced.

Embodiments of the present invention are described above. The present invention is not limited to the embodiments. Various design modifications can be made without deviating from the present invention described in claims.

As described above, in the present invention, the sliding holes only for the distributing valve need not be provided in the cylinder block to make the cylinder block smaller and reduce the number of processes. Parts only for the distributing valve are unnecessary to reduce the number of parts.

In the present invention, the sliding holes only for the first and second distributing valves need not be provided in the cylinder block to make the cylinder block smaller and reduce the number of processes. Parts only for the first and second distributing valves are unnecessary to reduce the number of parts.

In the present invention, the number of processes can be further reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A swash plate type hydraulic drive transmission comprising:

rotors including cylinder blocks are supported in a casing so as to be rotatable about the axis of said cylinder blocks;

plungers having an outer end brought into contact with and engaged with swash plates to form oil chambers between the plungers and the closed ends of cylinder holes, said plungers being slidably fitted in a plurality of said bottomed cylinder holes provided in said cylinder blocks in an annular arrangement; and distributing valves for allowing the oil chambers of the plungers moving to a side for expanding said oil chambers to be in communication with low pressure oil passages and for allowing the oil chambers of the plungers moving to a side for reducing said oil chambers to be in communication with high pressure oil passages, said distributing valves being provided to correspond to the plungers between the low pressure oil passages and the high pressure oil passages provided in said rotors and said oil chambers;

wherein the distributing valves alternately switch, corresponding to the axial reciprocating motion of the plungers, communication and cutoff communication between a plurality of communication passages communicated to said oil chambers opening to the inner surface of the cylinder holes and a plurality of low pressure and high pressure ports respectively in communication with said low pressure oil passages and said high pressure oil passages opening to the inner surface of the cylinder holes, wherein the low pressure oil passage includes a first low pressure annular recess in communication with the low pressure oil passage and a second low pressure annular recess in communication with an inner end of the low pressure oil passage.

2. The swash plate type hydraulic drive transmission according to claim 1, wherein the cylinder block is coaxially arranged relative to an input cylindrical shaft for providing a partial cover for the input cylindrical shaft.

3. The swash plate type hydraulic drive transmission according to claim 2, wherein said swash plate includes a protruding end extending from the cylinder block for being supported by the input cylindrical shaft.

4. The swash plate type hydraulic drive transmission according to claim 2, and further including an angular contact bearing and a ball bearing being interposed between the swash plate and the input cylindrical shaft wherein the swash plate is rotatably supported by the input cylindrical shaft with a posture tilted at a fixed angle relative to the axis of the cylinder block.

5. The swash plate type hydraulic drive transmission according to claim 1, wherein the high pressure oil passage includes first and second high pressure annular recesses in communication with the high pressure oil passage.

6. A hydrostatic type continuously variable transmission comprising:

rotors including cylinder blocks in common with a hydraulic pump (PA, PB) and a hydraulic motor (MA, MB) are supported in a casing so as to be rotatable about an axis of said cylinder blocks;

a plurality of pump plungers being provided in the hydraulic pump (PA, PB) to form pump oil chambers between the pump plungers and the closed end of pump cylinder holes, said pump plungers being slidably fitted in the bottomed cylinder holes provided in said cylinder blocks in an annular arrangement;

a plurality of motor plungers provided in the hydraulic motor (MA, MB) to form motor oil chambers between the motor plungers and the closed end of motor cylinder holes, said motor plungers being slidably fitted in the bottomed motor cylinder holes provided in said cylinder blocks in an annular arrangement;

a plurality of first distributing valves for allowing the pump oil chambers of the pump plungers in a suction region (S) to be in communication with low pressure oil passages and which allow the pump oil chambers of the pump plungers in a discharge region (D) to be in communication with high pressure oil passages, said first distributing valves being provided corresponding to the pump plungers between the low pressure oil passages and the high pressure oil passages provided in said rotors and said pump oil chambers; and a plurality of second distributing valves for allowing the motor oil chambers of the motor plungers in an expansion region (E) to be in communication with the high pressure oil passages and for allowing the motor oil chambers of the motor plungers in a reduction region (R) to be in communication with the low pressure oil passages, said second distributing valves being provided corresponding to the motor plungers between said low pressure oil passages and said high pressure oil passages and said motor oil chambers;

wherein the first distributing valves alternately switch, corresponding to the axial reciprocating motion of the pump plungers, communication and cutoff communication between a plurality of pump side communication passages in communication with the pump oil chambers opening to the inner surface of the pump cylinder holes and a plurality of first low pressure and high pressure ports respectively in communication with said low pressure oil passages and said high pressure oil passages opening to the inner surface of the pump cylinder holes and the second distributing valves alternately switch, corresponding to the axial reciprocating motion of the motor plungers, communication and cutoff communication between a plurality of motor side communication passages in communication with the motor oil chambers opening to the inner surface of the motor cylinder holes and a plurality of second low pressure and high pressure ports respectively in communication with said low pressure oil passages and said high pressure oil passages opening to the inner surface of the motor cylinder holes, wherein the high pressure oil passage includes first and second high pressure annular recesses in communication with the high pressure oil passage.

7. The hydrostatic type continuously variation transmission according to claim 6, wherein said rotor includes said cylinder block and a rotational axis coaxially pressed into the cylinder block, a plurality of said pump side communication passages are in part constructed by a plurality of pump side communication grooves provided in the outer circumferential surface of said rotation axis and a plurality of said motor side communication passages are in part constructed by a plurality of motor side communication grooves provided in the outer circumferential surface of said rotation axis.

8. The hydrostatic type continuously variation transmission according to claim 6, wherein the cylinder block is coaxially arranged relative to an input cylindrical shaft for providing a partial cover for the input cylindrical shaft.

9. The hydrostatic type continuously variation transmission according to claim 8, wherein a pump swash plate includes a protruding end extending from the cylinder block for being supported by the input cylindrical shaft.

10. The hydrostatic type continuously variation transmission according to claim 9, and further including an angular contact bearing and a ball bearing being interposed between the pump swash plate and the input cylindrical shaft wherein the pump swash plate is rotatably supported by the input cylindrical shaft with a posture tilted at a fixed angle relative to the axis of the cylinder block.

11. The hydrostatic type continuously variation transmission according to claim 6, wherein the low pressure oil passage includes a first low pressure annular recess in communication with the low pressure oil passage and a second low pressure annular recess in communication with an inner end of the low pressure oil passage.

12. A hydrostatic type continuously variable transmission comprising:

rotors including cylinder blocks in common with a hydraulic pump (PA, PB) and a hydraulic motor (MA, MB) are supported in a casing so as to be rotatable about an axis of said cylinder blocks;

a plurality of pump plungers being provided in the hydraulic pump (PA, PB) to form pump oil chambers between the pump plungers and the closed end of pump cylinder holes, said pump plungers being slidably fitted in the bottomed cylinder holes provided in said cylinder blocks in an annular arrangement;

a plurality of motor plungers provided in the hydraulic motor (MA, MB) to form motor oil chambers between the motor plungers and the closed end of motor cylinder holes, said motor plungers being slidably fitted in the bottomed motor cylinder holes provided in said cylinder blocks in an annular arrangement;

a plurality of first distributing valves for allowing the pump oil chambers of the pump plungers in a suction region (S) to be in communication with low pressure oil passages and which allow the pump oil chambers of the pump plungers in a discharge region (D) to be in communication with high pressure oil passages, said first distributing valves being provided corresponding to the pump plungers between the low pressure oil passages and the high pressure oil passages provided in said rotors and said pump oil chambers; and a plurality of second distributing valves for allowing the motor oil chambers of the motor plungers in an expansion region (E) to be in communication with the high pressure oil passages and for allowing the motor oil chambers of the motor plungers in a reduction region (R) to be in communication with the low pressure oil passages, said second distributing valves being provided corresponding to the motor plungers between said low pressure oil passages and said high pressure oil passages and said motor oil chambers;

wherein the first distributing valves alternately switch, corresponding to the axial reciprocating motion of the pump plungers, communication and cutoff communication between a plurality of pump side communication passages in communication with the pump oil chambers opening to the inner surface of the pump cylinder holes and a plurality of first low pressure and high pressure ports respectively in communication with said low pressure oil passages and said high pressure oil passages opening to the inner surface of the pump cylinder holes and the second distributing valves alternately switch, corresponding to the axial reciprocating motion of the motor plungers, communication and cutoff communication between a plurality of motor side communication passages in communication with the motor oil chambers opening to the inner surface of the motor cylinder holes and a plurality of second low pressure and high pressure ports respectively in communication with said low pressure oil passages and said high pressure oil passages opening to the inner surface of the motor cylinder holes, and wherein said rotor includes said cylinder block and a rotational axis coaxially pressed into the cylinder block, a plurality of said pump side communication passages are in part constructed by a plurality of pump side communication grooves provided in the outer circumferential surface of said rotation axis and a plurality of said motor side communication passages are in part constructed by a plurality of motor side communication grooves provided in the outer circumferential surface of said rotation axis.

* * * * *